United States Patent [19]
Rudi et al.

[11] Patent Number: 4,678,906
[45] Date of Patent: Jul. 7, 1987

[54] DEVICE FOR TRANSMITTING THROUGH AN OPTICAL COUPLING DATA ISSUING FROM A STEERING WHEEL TO AN ELEMENT MOUNTED ON A VEHICLE

[75] Inventors: Alain Rudi, Essert; Maurice Bertot, Montbeliard, both of France

[73] Assignee: Aciers et Outillage Peugeot, Audincourt, France

[21] Appl. No.: 800,871

[22] Filed: Nov. 22, 1985

[30] Foreign Application Priority Data

Nov. 27, 1984 [FR] France ................................ 84 18064

[51] Int. Cl.⁴ .............................................. H01J 5/16
[52] U.S. Cl. ..................................... 250/227; 250/551
[58] Field of Search ................ 250/227, 551; 455/602

[56] References Cited

U.S. PATENT DOCUMENTS 4,456,903 6/1984 Kishi et al. ...................... 455/602 X

FOREIGN PATENT DOCUMENTS 0166354 12/1980 Japan ................................... 455/602
0152243 9/1982 Japan ................................... 455/602

*Primary Examiner*—Eugene R. LaRoche
*Assistant Examiner*—David Mis
*Attorney, Agent, or Firm*—Sughrue, Mion, Zinn, Macpeak, and Seas

[57] ABSTRACT

This device for transmitting data, coming from a plurality of control elements (8 to 11) mounted on a steering wheel of a motor vehicle, to a system recognizing the data and also mounted on the vehicle, comprises light sources (12 to 15) mounted on the steering wheel and respectively connected to the control elements. The light sources are disposed in such manner as to cooperate with annular means (16 to 19) coaxial with the steering wheel for transmitting light to photosensitive detectors (30 to 33) mounted on the vehicle and adapted to actuate loads corresponding to the actuated control elements, irrespective of the position of the light sources relative to the photosensitive detectors.

5 Claims, 7 Drawing Figures

DEVICE FOR TRANSMITTING THROUGH AN OPTICAL COUPLING DATA ISSUING FROM A STEERING WHEEL TO AN ELEMENT MOUNTED ON A VEHICLE

The present invention relates to devices for transmitting data coming from a steering wheel to an element mounted on a vehicle, and in particular transmitting instructions given by the driver of the vehicle, which are expressed by actions on control elements mounted on the steering wheel, to a system recognizing the data, mounted on the vehicle.

There exist in the prior art devices for transmitting data which employ rotating rubbing contacts for providing an electric connection permitting the transmission of the data between the control elements carried by the steering wheel and the system recognizing the data mounted on the vehicle.

These devices have drawbacks related to the use of rotating rubbing contacts.

Indeed, the rotating rubbing contacts may deteriorate with use and consequently compromise the quality of the transmission.

An object of the invention is to provide a device for transmitting data coming from a plurality of control elements mounted on a steering wheel to a system recognizing the data which avoids the electric connections for transmitting the data between the movable steering wheel and the fixed recognizing system.

The invention therefore provides a device for transmitting data coming from a plurality of control elements mounted on a steering wheel of a motor vehicle, to a system recognizing the data mounted on the vehicle, said device comprising light sources mounted on the steering wheel and respectively connected to the control elements, the light sources being disposed in such manner as to cooperate with annular means coaxial with the steering wheel for transmitting the light to corresponding photosensitive detectors mounted on the vehicle, irrespective of the relative position of each photosensitive detector relative to the light source with which it is coupled, the photosensitive detectors being adapted to actuate loads corresponding to the actuated control elements.

A better understanding of the invention will be had from the following description, which is given solely by way of example with reference to the accompanying drawings, in which.

Figure 1:
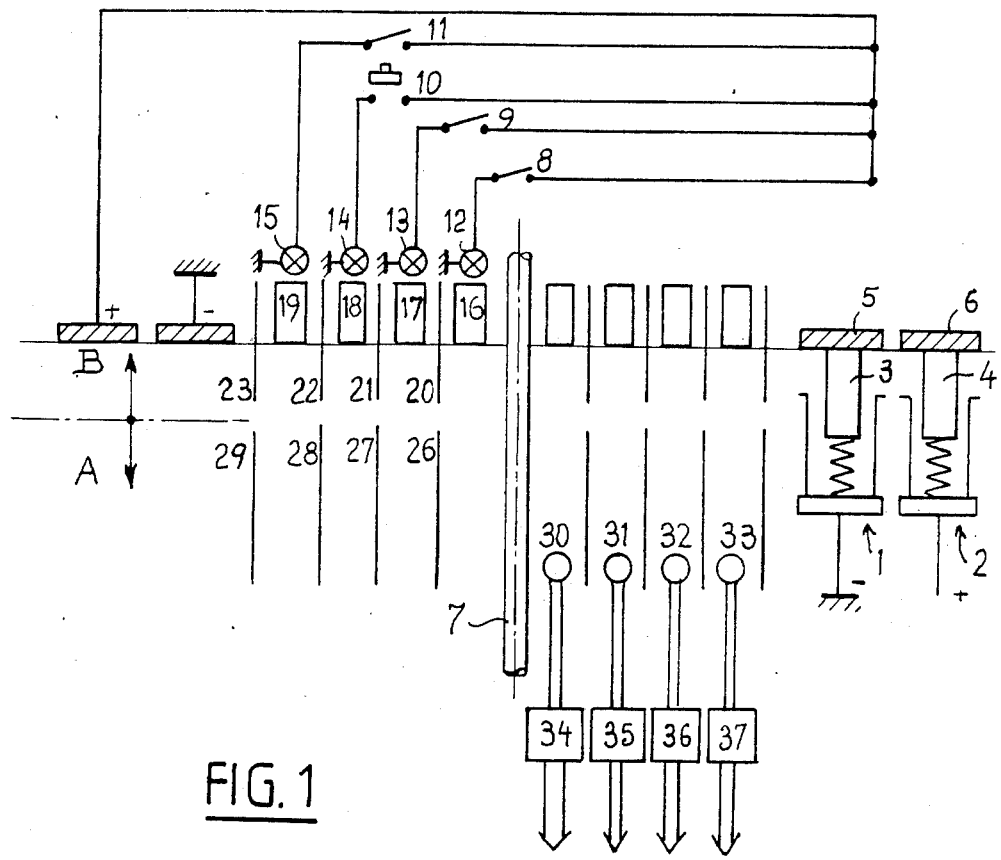
FIG. 1 is a diagram of the principle of operation of a data transmitting device according to the invention.

The data transmitting device according to the invention, as shown in FIG. 1, comprises a part A mounted on a vehicle and a part B mounted on a steering wheel. These two parts are rotatable relative to each other.

Power is supplied to the movable part B through two rotating rubbing contacts 1 and 2, of which the contact 2 is connected to the positive terminal of the battery of the vehicle and the contact 1 is connected to the ground. These rotating rubbing contacts 1 and 2 include brushes 3 and 4 mounted on the vehicle which bear against circular tracks 5 and 7 respectively, formed by any suitable material and mounted on the steering wheel.

These tracks 5 and 6 are coaxial with the steering shaft 7, the track 5 is connected to the ground of the steering wheel while the track 6 is connected to a terminal of control elements 8 to 11, such as, for example, push-buttons, etc..

According to another embodiment of the invention, the movable part is supplied with power, for example by a dry battery device or any other source capable of being integrated within the steering wheel.

The output terminals of the control elements 8 to 11 are connected to the input terminals of light sources 12 to 15 respectively.

The output terminals of these light sources are connected to the ground. These light sources which, for example, may be lamps such as those for illuminating the control panel of a vehicle, are disposed in the vicinity of rings 16 to 19 respectively, as will be understood hereinafter. The rings 16 to 19 are coaxial with the steering shaft 7.

The light sources 12 to 15 and the corresponding rings 16 to 19 are disposed in annular cavities defined by opaque walls or partitions 20 to 23, and the steering shaft 7. These walls 20 to 23 of revolution about the steering shaft 7, are mounted on the movable steering wheel.

As the rings 16 to 19 are of identical form, only one thereof will be described.

Figure 2:
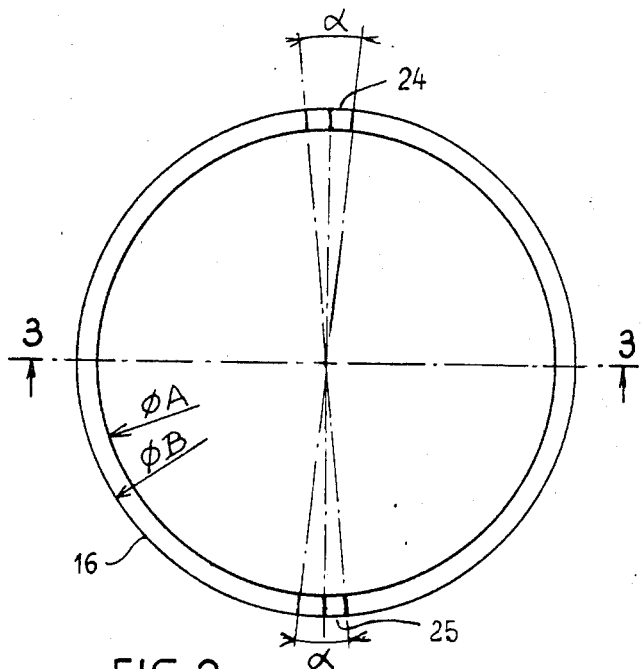
FIG. 2 is a top plan view of a ring which is a part of the construction of a data transmitting device according to the invention.

As can be seen in FIG. 2, the ring 16 is in the form of a portion of a hollow cylinder composed of a transparent material such as, for example, metacrylate, and has an inside diameter $\phi A$ and an outside diameter $\phi B$. Two notches 24 and 25, adapted to reflect the rays emitted by the light sources, are formed symmetrically relative to the centre of said ring and have an angle $\alpha$ suspended at the centre of the ring.

Figure 3:
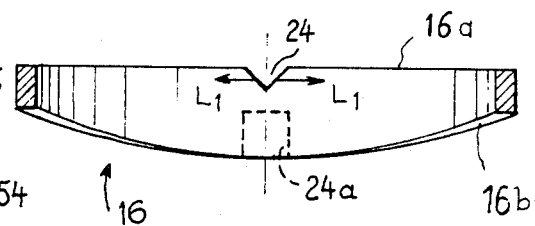
FIG. 3 is a sectional view taken on line 3—3 of FIG. 2.

FIG. 3 shows that the notch 24 which has a generally V shape and may have an apex angle equal to 90°, is formed in a planar side 16a of the ring.

Two recesses 24a and 25a, in alignment with the notches 24 and 25, are formed in the side 16b of the ring.

Figure 4:
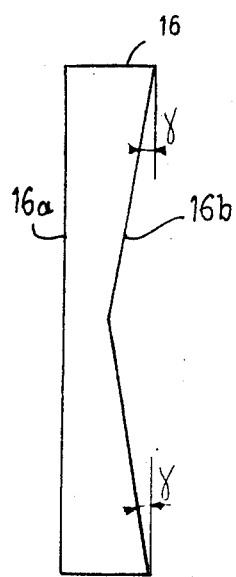
FIG. 4 is a right view of the ring shown in FIG. 2 in projection.

As can be seen in FIG. 4, the side 16b of the ring corresponds in projection, when the ring shown in FIG. 2 is viewed from the right side, to two straight lines defining a wide V-shaped recess, these lines making an angle $\gamma$ relative to a line parallel to the planar side 16a.

This angle $\gamma$ corresponds to a configuration of total reflection of the side 16b for certain rays. Indeed, it will be seen hereinafter that this side 16b performs the function of a reflecting surface for the light rays coming from light sources placed in the recesses 24a and 25a and propagated through the ring. The angle $\gamma$ is determined as a function of the index of refraction of the material of which the ring is composed.

The light sources are positioned in the recesses 24a or 25a of the corresponding rings and the planar sides of the rings are disposed in such manner as to be in confronting relation to the fixed part of the transmitting device.

These planar sides of the rings 16 to 19 are therefore disposed in facing relation to cavities defined by the annular and opaque walls 26 to 29 and the steering shaft 7 (FIG. 1). These walls 26 to 29 are, in this embodiment, mounted on the vehicle. The photosensitive detectors 30 to 33 are positioned within the cavities defined by said walls. The outputs of these detectors are connected to the inputs of devices 34 to 37 for processing and amplifying the output signals from said detectors. The outputs of the devices 34 to 37 are connected to loads (not shown).

Figure 5:
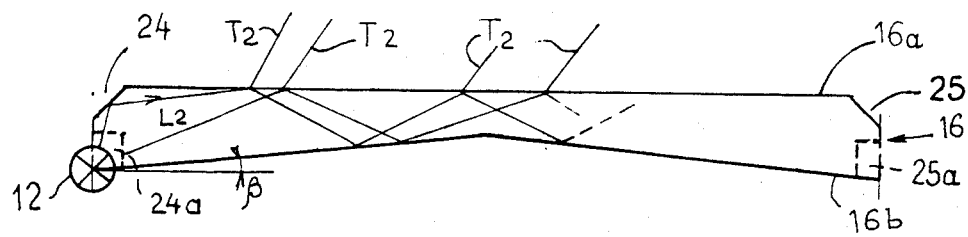
FIG. 5 is a developed view of a ring which is a part of the construction of a device according to the invention.

The transmitting device according to the invention operates in the following manner:

When one of the control elements, for example the element 8, is actuated, the light source 12 is lit. Certain light rays coming from this light source travel through the path $L_1$ (FIG. 3) and thus illuminate the interior of the ring 16. The path $L_2$ (FIG. 5) within the material constituting the ring is such that the rays are in part reflected by the notch 24 or the side 16a of the ring 16. A part of these rays is sent back to the side 16b which, when developed, makes an angle $\beta$ with a line parallel to the side 16a. This angle $\beta$ is determined as a function of the index of refraction of the material of the ring and the side 16b acts as a reflecting surface and the rays are reflected by the side 16b toward the side 16a of the ring. When the rays impinge on the side 16a, a part thereof is reflected toward the side 16b while another part, $T_2$, is transmitted to the exterior of the ring 16 through the side 16a. This phenomenon is periodically reproduced on the side 16a of the ring 16 so that the side 16a becomes luminous when the lamp 16 is lit. The same is true in respect of the other rings when the corresponding light sources are lit.

The side 16b may be metallized so as to return all the rays which are reflected on this side along the path $L_2$. The luminosity of the side 16a may be accentuated by producing scratches or grooves directed toward the centre of the ring and having an apex angle of 90° or by employing a dulled or frosted surface.

The side 16a of the ring 16 therefore illuminates the cavities of the movable part (FIG. 1) defined by the partitions 20 to 23 and the steering shaft 7 and the cavities of the fixed part of the device defined by the partitions 26 to 29 and the steering shaft 7 in alignment with the cavities of the movable part.

The photosensitive detector 30, disposed in the cavity defined by the steering shaft 7 and the partition 26, is therefore illuminated and triggers the processing and amplifying device 34 which actuates the load corresponding to the actuated control element.

The opaque partitions may be made from a cheap material such as thin sheet metal, cardboard treated with bakelite, impregnated paper . . . or made from a single part by moulding with the fixed part or the movable part of the device. The clearance between the partitions carried by the movable part and the partitions connected to the fixed part may be on the order of 1 to 5 mm, which avoids excessively costly assembly precisions.

According to another embodiment of the transmitting device according to the invention, the partitions 20 to 23 are eliminated by providing the inner and outer cylindrical faces 16 to 19 with an opaque layer formed, for example, by black paint.

Figure 6:
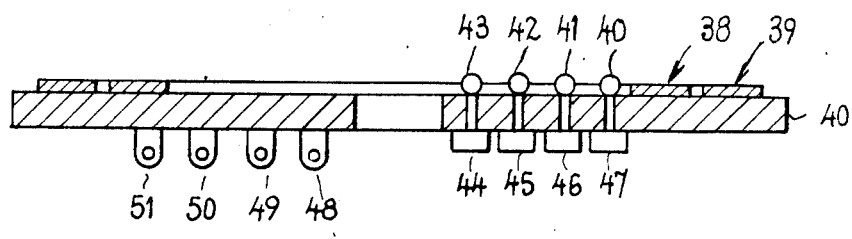
FIG. 6 is a view of an embodiment of a device according to the invention.

According to an advantageous embodiment shown in Fig.6, there is employed a double-sided printed circuit board 40 as the support of the fixed part of the transmitting device. Indeed, the circular tracks 38 and 39 of the rotating rubbing contacts, which, in the first embodiment, were mounted on the steering wheel, are provided on the upper surface of the board 40 mounted on the vehicle.

The photosensitive detectors 40 to 43 are also disposed on this upper surface of the board. The processing and amplifying devices 44 to 47 are disposed on the lower surface of said board 40 together with the connecting devices 48 to 51 connecting the devices mounted on the printed circuit board, for example, to the loads.

According to another embodiment of the invention, the annular transmitting means are formed by optical fibres.

Figure 7:
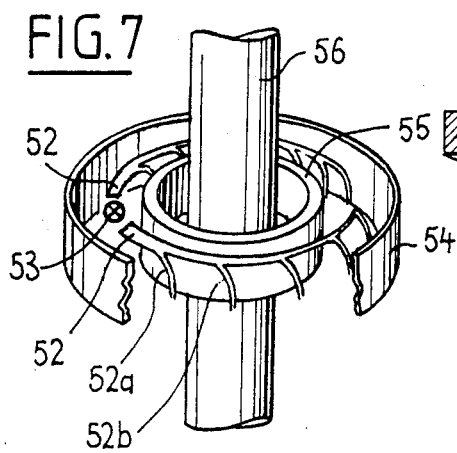
FIG. 7 is a perspective view of an embodiment of a device according to the invention employing a fibre optics system.

As can be seen in FIG. 7 illustrating an example of such an embodiment, the first ends of the optical fibres are in the form of torii 52, are disposed in the vicinity of a light source 53 controlled by the corresponding control element, as described before.

The second ends 52a, 52b of the optical fibres are disposed at equal distances apart for example on a circle facing a corresponding photosensitive detector (not shown).

The arrangement of this photosensitive detector is the same as that of the first embodiment.

The second end disposed on a circle define therefore annular light transmitting means irrespective of the relative position of the light source 53 relative to the corresponding photosensitive detector.

The light source 53 and the torii 52 of the corresponding optical fibres may be disposed, for example, in cavities defined by opaque walls 54, 55 of revolution around the steering shaft 56 and mounted on the steering wheel, as in the first embodiment.

Therefore, with the device according to the invention, all the electric connections for transmitting the data are avoided.

What is claimed is:

1. A device, in combination with a plurality of control elements which are mounted on a steering wheel of a motor vehicle and which emit data and a system recognizing said data and mounted on the vehicle, for transmitting said data from said control elements to said system, said device comprising a plurality of light sources mounted on the steering wheel and respectively connected to said control elements, annular means coaxial with the steering wheel, photosensitive detectors mounted on the vehicle and corresponding to said light sources, said light sources being disposed in such manner as to cooperate with said annular means so as to transmit light to said corresponding detectors irrespective of the position of each photosensitive detector relative to the light source with which it is coupled, said photosensitive detectors being adapted to actuate loads corresponding to the actuated ones of said control elements, each of the light transmitting annular means comprising a planar side disposed in confronting relation to the corresponding photosensitive detector and in which side is formed at least one notch, and a side for reflecting the light propagated in said annular means in which reflecting side is provided at least one recess in which at least one light source is disposed, and wherein said rereflecting side corresponds in projection, when viewed from a side, to two straight lines defining a wide V-shaped recess.

2. A device according to claim 1, wherein inner and outer cylindrical sides of the annular means are covered with a layer of opaque material.

3. A device according to claim 1, wherein said photosensitive detectors are disposed on a side of a double-sided printed circuit board and devices for processing and amplifying output signals of said photosensitive detectors are disposed on an opposite side of said board.

4. A device, in combination with (1) a plurality of control elements which are mounted on a steering wheel of a motor vehicle and which emit data and (2) a system recognizing said data and mounted on the vehicle, for transmitting said data from said control elements to said system, said device comprising a plurality of light sources mounted on the steering wheel and respectively connected to said control elements, annular means coaxial with the steering wheel, photosensitive detectors mounted on the vehicle and corresponding to said light sources, said light sources being disposed in such manner as to cooperate with said annular means so as to transmit light to said corresponding detectors irrespective of the position of each photosensitive detector relative to the light source with which it is coupled, said photosensitive detectors being adapted to actuate loads corresponding to the actuated ones of said control elements, each of the light transmitting annular means comprising a planar side disposed in confronting relation to the corresponding photosensitive detector and in which side is formed at least one notch, and a side for reflecting the light propagated in said annular means in which reflecting side is provided at least one recess in which at least one light source is disposed, and wherein inner and outer cylindrical sides of the annular means are covered with a layer of opaque material.

5. A device, in combination with (1) a plurality of control elements which are mounted on a steering wheel of a motor vehicle and which emit data and (2) a system recognizing said data and mounted on the vehicle, for transmitting said data from said control elements to said system, said device comprising a plurality of light sources mounted on the steering wheel and respectively connected to said control elements, annular means coaxial with the steering wheel, photosensitive detectors mounted on the vehicle and corresponding to said light sources, said light sources being disposed in such manner as to cooperate with said annular means so as to transmit light to said corresponding detectors irrespective of the position of each photosensitive detector relative to the light source with which it is coupled, said photosensitive detectors being adapted to actuate loads corresponding to the actuated ones of said control elements, wherein said photosensitive detectors are disposed on a side of a double-sided printed circuit board and devices for processing and amplifying output signals of said photosensitive detectors are disposed on an opposite side of said board.

* * * * *